United States Patent
Kulsangcharoen et al.

(10) Patent No.: US 11,670,447 B2
(45) Date of Patent: Jun. 6, 2023

(54) AUTOTRANSFORMER RECTIFIER UNIT SYSTEM

(71) Applicant: Hamilton Sundstrand Corporation, Charlotte, NC (US)

(72) Inventors: Ponggorn Kulsangcharoen, West Midlands (GB); Rodrigo Fernandez-Mattos, West Midlands (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 58 days.

(21) Appl. No.: 17/212,127

(22) Filed: Mar. 25, 2021

(65) Prior Publication Data

US 2021/0319949 A1    Oct. 14, 2021

(30) Foreign Application Priority Data

Apr. 9, 2020 (GB) ...................... 2005310

(51) Int. Cl.
| | |
|---|---|
| *H02M 7/08* | (2006.01) |
| *H01F 30/02* | (2006.01) |
| *H01F 30/12* | (2006.01) |
| *H02J 3/18* | (2006.01) |
| *H02M 7/06* | (2006.01) |

(52) U.S. Cl.
CPC ............. *H01F 30/02* (2013.01); *H01F 30/12* (2013.01); *H02J 3/1878* (2013.01); *H02M 7/068* (2013.01); *H02M 7/08* (2013.01)

(58) Field of Classification Search
CPC .......... H02M 7/08; H02M 7/68; H02J 3/1878; H01F 30/02; H01F 30/12
See application file for complete search history.

(56) References Cited

U.S. PATENT DOCUMENTS

| | | | |
|---|---|---|---|
| 4,405,894 A | 9/1983 | Rice et al. | |
| 4,745,647 A | 5/1988 | Goodwin | |
| 6,101,113 A * | 8/2000 | Paice ....................... | H01F 30/12 363/126 |
| 6,982,884 B1 * | 1/2006 | Paice ..................... | H02J 3/1878 363/39 |
| 7,233,506 B1 * | 6/2007 | Paice ..................... | H02M 7/043 363/129 |
| 8,729,844 B2 | 5/2014 | Feng et al. | |
| 2015/0130439 A1 * | 5/2015 | Wang ....................... | H03H 7/40 323/299 |
| 2017/0250023 A1 * | 8/2017 | Valdivia-Guerrero ....................... | H02M 7/068 |

FOREIGN PATENT DOCUMENTS

| | | |
|---|---|---|
| GB | 825083 A | 12/1959 |
| GB | 951720 A | 3/1964 |

* cited by examiner

*Primary Examiner* — Harry R Behm
(74) *Attorney, Agent, or Firm* — Cantor Colburn LLP

(57) ABSTRACT

An auto-transformer rectifier system comprising an 18-pulse (or multiple of 18-pulse) autotransformer rectifier unit ATRU having three, or a multiple of three, diode bridge rectifiers and a balancing resistor to balance the power flow through the diode bridge rectifiers, wherein the balancing resistor has a variable resistance, and further comprising a controller configured to identify imbalances between power flows of the respective diode bridge rectifiers and to adjust the resistance of the balancing resistor in response to the detected imbalance.

10 Claims, 3 Drawing Sheets

AUTOTRANSFORMER RECTIFIER UNIT SYSTEM

FOREIGN PRIORITY

This application claims priority to United Kingdom Patent Application No. 2005310.4 filed Apr. 9, 2020, the entire contents of which is incorporated herein by reference.

TECHNICAL FIELD

The present disclosure is concerned with a winding configuration for an auto-transformer rectifier unit (ATRU) system and, more particularly, an ATRU system including a balancing resistor.

BACKGROUND

Many loads connected to AC supplies require DC power and convert the AC power into DC power.

This is common, for example, in aircraft in which the aircraft is equipped with an internal 3-phase network. The frequency of the electric current over the power supply network can be variable.

Electric power systems onboard aircraft are generally powered by generators that use rotation of the aircraft engine to generate AC power, usually 230V 400 Hz AC power. Often, onboard systems require DC power rather than AC power and so a power converter or rectifier unit is usually provided to provide a suitable rectified DC output to the systems. Rectification using diode pairs gives rise to harmonic distortions in the input signals.

It is necessary, particularly in aircraft, to reduce harmonic currents generated by the conversion process and several solutions are available. Such solutions include passive filtering combined with 6-pulse rectification, active rectification, phase multiplication and the like. In particular, aircraft use multiphase conversion as this is known to be particularly reliable. Aircraft AC to DC conversion systems often use a multiphase transformer, supplied from a 3-phase source and generating a multiphase AC supply for conversion into DC power. The transformer typically includes conductive windings including a primary winding that induces electrical current flow into the extended delta connection to produce the required phase shift. The windings are typically wound around a core.

Systems are known using a 12-pulse ATRU arrangement in which two rectifier converters are arranged in parallel.

A 12-pulse ATRU comprises a three-phase winding usually in a delta configuration and extended windings connected to the common line-to-line node of the delta connection, this is known as extended delta connection. The extended delta windings are connected to two rectifier bridges which operate in parallel and, to balance DC currents and avoid circulating currents, two interphase transformers are required.

The ATRU converts a 3-phase supply, e.g. the power supply on board an aircraft, into a sub-supply which is rectified by diode bridge rectifiers. The outputs from the diode bridge rectifiers are combined by two interphase transformers or chokes that feeds a DC-link capacitor. The converter provides a DC output voltage.

12-pulse rectifiers, commonly used in aircraft and aerospace applications, are known to generate levels of specific harmonics above acceptable thresholds set by the aerospace industry.

In modern aircraft especially those with electric power systems operating over a wide frequency range but also with constant frequency systems, it is desirable to keep the level of total harmonic distortion and specific harmonics low, and sometimes below that generally achievable with 12-pulse systems. An 18-pulse or more system can reduce harmonic distortion further, providing a system with better power quality. An example of an 18-pulse converter can be found in U.S. Pat. No. 8,729,844.

With 3-diode bridge rectifiers such as 18-pulse system or multiples thereof, only two of the three phases will pass through the ATRU and the third will bypass the ATRU. To balance the power flow so that all three rectifiers have the same power flow, a balancing resistor is usually provided to the bypass bridge. The value of the resistor is usually selected to provide the best balance at frequencies in or near the middle of the normal frequency for aircraft operation. Aircraft usually operate in the range of 360 Hz to 800 Hz and so the value of the resistor is usually selected to optimise power flow balance at around 600 Hz. The power balance is, however, not optimal when the aircraft is operating at other frequencies.

There is a need to provide an autotransformer rectifier unit that can better optimise the balance of power flow at the output of the rectifier units for a greater frequency range.

SUMMARY

According to one aspect, there is provided an autotransformer rectifier system comprising an 18-pulse (or multiple of 18-pulse) autotransformer rectifier unit ATRU having three, or a multiple of three, diode bridge rectifiers and a balancing resistor to balance the power flow through the diode bridge rectifiers, wherein the balancing resistor has a variable resistance, and further comprising a controller configured to identify imbalances between power flows of the respective diode bridge rectifiers and to adjust the resistance of the balancing resistor in response to the detected imbalance.

According to a second aspect, there is provided a method of balancing power flow through an ATRU having multiple diode bridge rectifiers, comprising identifying imbalances between power flows of the respective diode bridge rectifiers and adjusting the resistance of a balancing resistor of the ATRU in response to the detected imbalance.

Imbalances may be identified by measuring and comparing the output currents of two or more of the diode bridge rectifiers, whereby a difference is indicative of an imbalance and generates an error signal used to adjust the resistance.

Imbalances may also be identified from a change in input frequency, with the resistance being adjusted in response to a detected change.

It is envisaged that imbalances could also be identified in other ways.

BRIEF DESCRIPTION OF THE DRAWINGS

Preferred embodiments of the arrangement will now be described by way of example only, with reference to the drawings.

DETAILED DESCRIPTION

The described embodiments are by way of example only. The scope of this disclosure is limited only by the claims.

Figure 1:
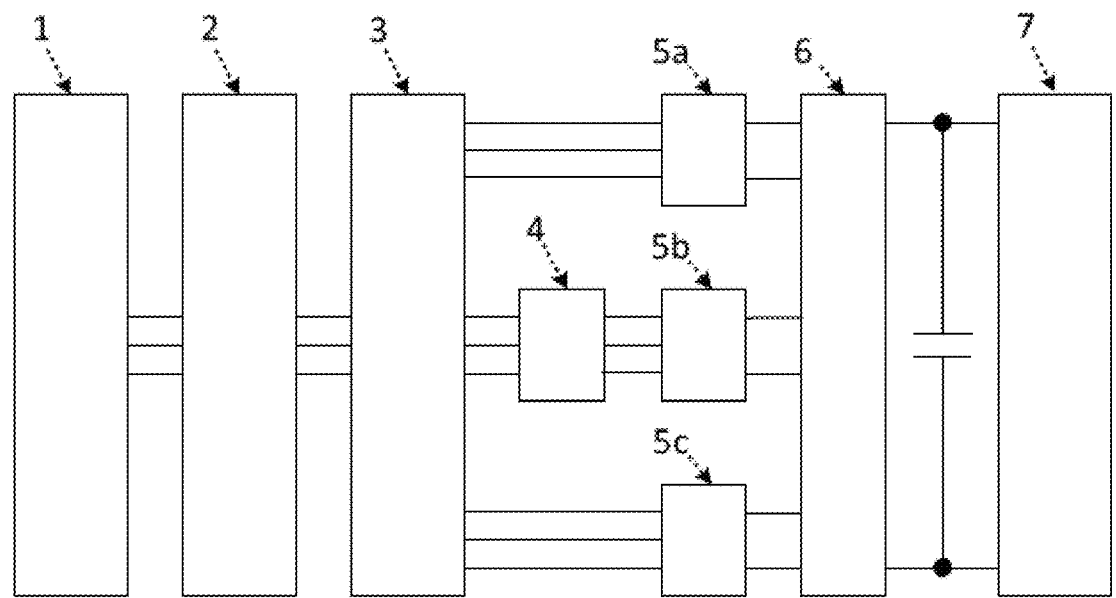
FIG. 1 is a schematic view of a typical 18-pulse ATRU system.

A typical 18-pulse ATRU system will now be briefly described, by way of example only, with reference to FIG. 1. The system comprises a 3-phase AC power supply 1, an optional input filter 2, an 18-pulse ATRU 3, balancing resistors 4, diode bridge rectifiers 5a, 5b and 5c, a common DC link and capacitor 8 and a load 7. To further limit harmonic distortion, the system may also be provided with an inter-phase transformer (IPT) or zero-sequence blocking transformers (ZSBT) 6.

As mentioned above, regardless of the winding scheme used for making the 18-pulse ATRU, this topology always requires balancing resistors 4 to maintain an equivalent power flow for all three diode bridge rectifiers 5a, 5b and 5c, specifically to ensure a balance between diode bridge rectifier 5b and rectifiers 5a and 5c. To keep a balanced power flow condition, all three current flow paths must have equal impedances. If the power flow is unbalanced, high power losses can be caused in components, which, in turn, directly affects the component power rating and may require extra cooling equipment. This, in turn, adds to the overall system size and weight.

The balancing resistors 4 include a fixed value resistor, selected to optimise power balance at around the middle of the frequency range at which an aircraft operates for most of its flight phase, e.g. around 600 Hz.

The aim of the system of this disclosure is to provide power balance over a greater range of frequencies. To do this, the balancing resistor of the system as described above is replaced by a self-adjusting balancing resistor which changes its resistance accordance to any imbalance in power flow between the diode bridge rectifiers. Imbalance may be determined by a change in input frequency or an impedance mismatch among rectifier flow paths as will be further described below.

The imbalance is determined and the value of the resistor is adjusted by means of a controller 80, again as described further below.

Figure 2:
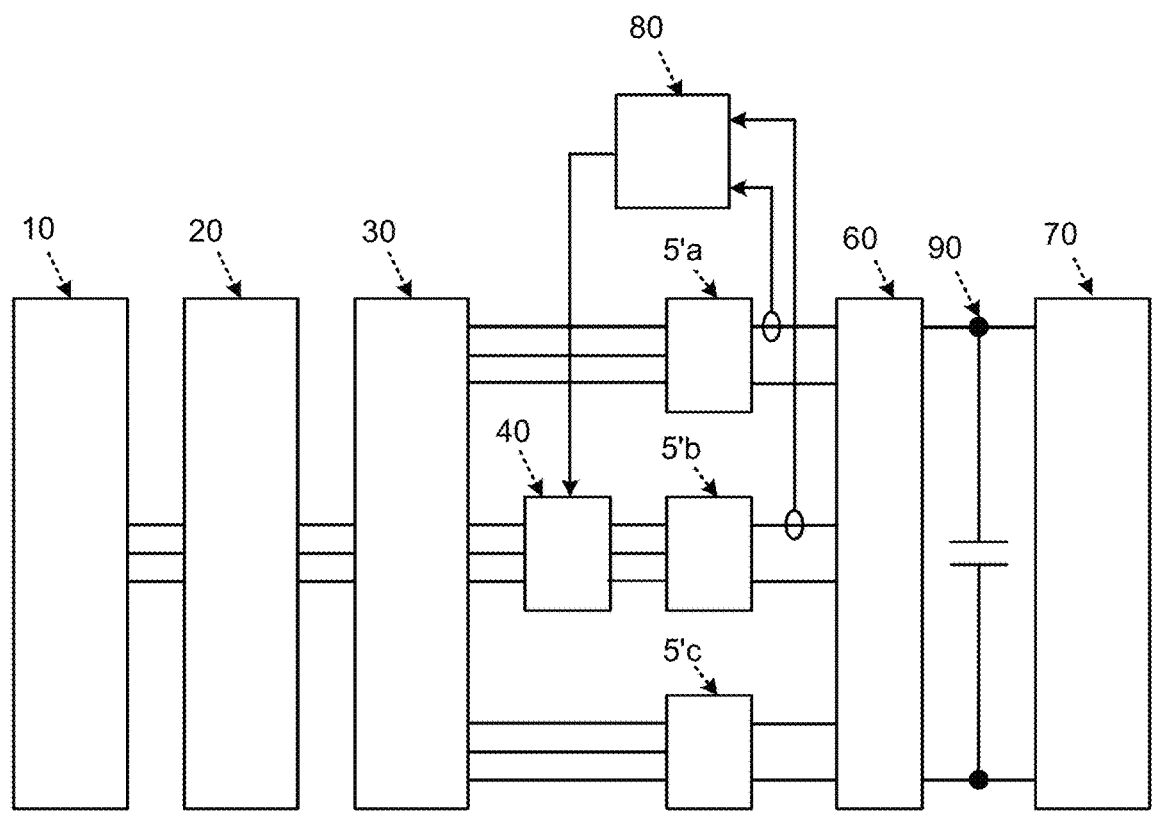
FIG. 2 is a schematic view of an 18-pulse ATRU modified according to one embodiment of the disclosure.

One embodiments of an ATRU system with a self-adjusting balancing resistor according to the disclosure is described with reference to FIG. 2.

The system is similar to the system in FIG. 1 and includes a three-phase supply 10, an input filter 20, and 18-pulse ATRU unit 30, a ZSBT or a IPT 60, a load 70, a common DC link 90 and three diode bridge rectifiers 5'a, 5'b and 5'c. Instead of the fixed value balancing resistor as in FIG. 1, this system has a self-adjusting resistor 40 controlled by a controller 80. The controller 80 may be an analog circuit that detects signals indicative of imbalance and controls the resistance of the resistor 40 accordingly. The resistor is any known variable resistor and may include e.g. a solid state switch such as a Rdson or MOSFET device. In addition, a self-adjusting resistor unit can be a combination of fixed resistors and variable resistors.

In an embodiment, the power imbalance is determined by measuring and comparing output currents of the diode bridge rectifiers. In the method shown in FIG. 2, the difference between the output current of diode bridge rectifier 5a and that of 5b is determined as an error signal and is provided to the controller which changes the resistor resistance accordingly. The error signal could equally be determined from the different between the output currents of 5c and 5a.

Figure 3:
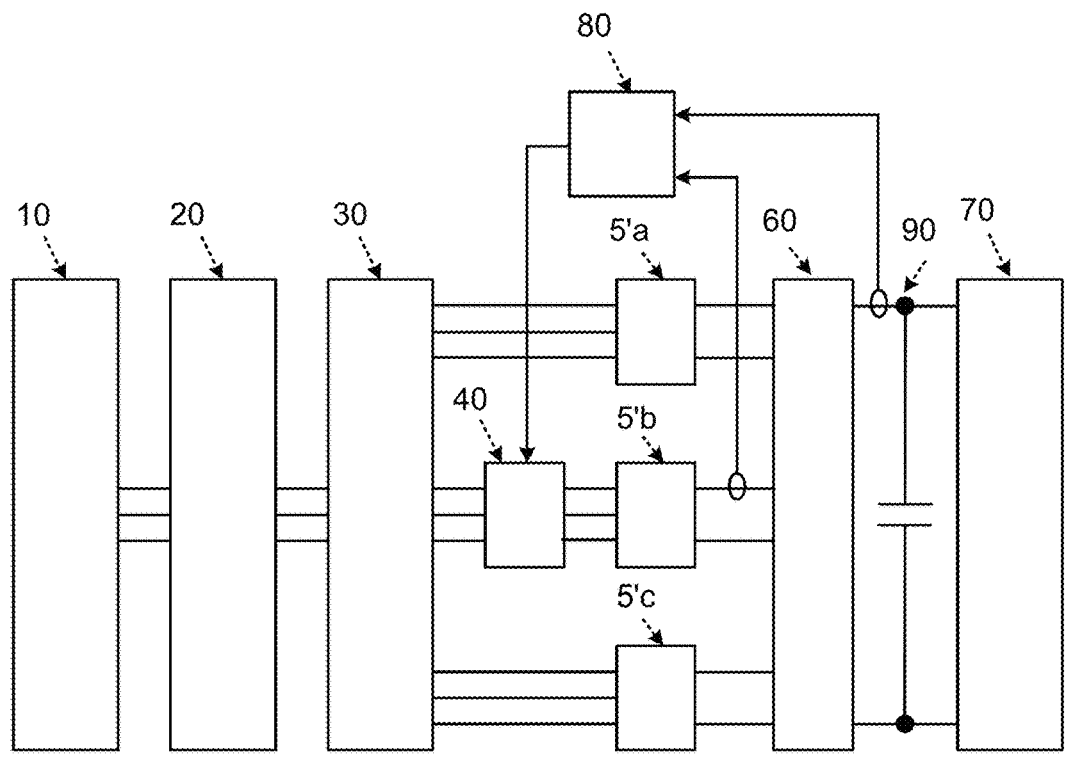
FIG. 3 is a schematic view of an 18-pulse ATRU modified according to another embodiment of the disclosure.

In an alternative embodiment, the imbalance can be determined as shown in FIG. 3 whereby the DC link current is measured and divided by the number of bridges (here, 3) to give the reference current value indicative of the output current each diode bridge rectifier should provide in a balanced condition. This is then compared by the controller 80 with the output current of the balancing diode bridge rectifier 5b and the resistance is adjusted accordingly.

Figure 4:
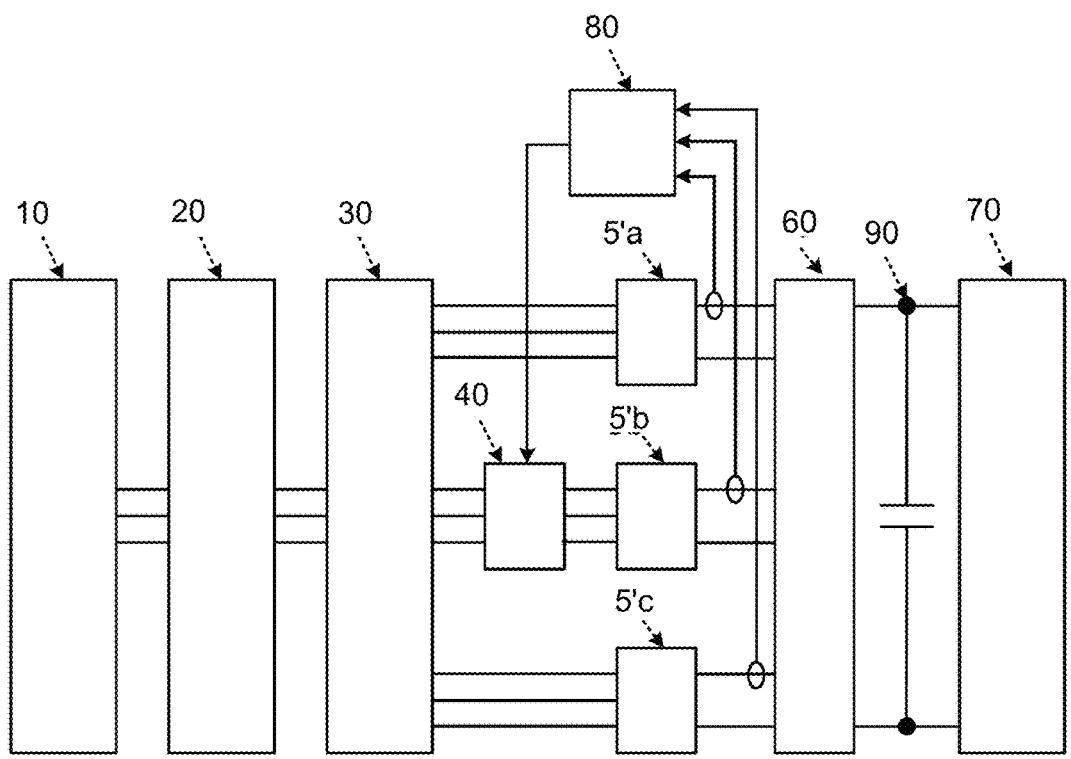
FIG. 4 is a schematic view of an 18-pulse ATRU modified according to another embodiment of the disclosure.

FIG. 4 shows an alternative embodiment in which the output currents of all three diode bridge rectifiers are measured and compared in controller 80 to adjust the resistance.

Figure 5:
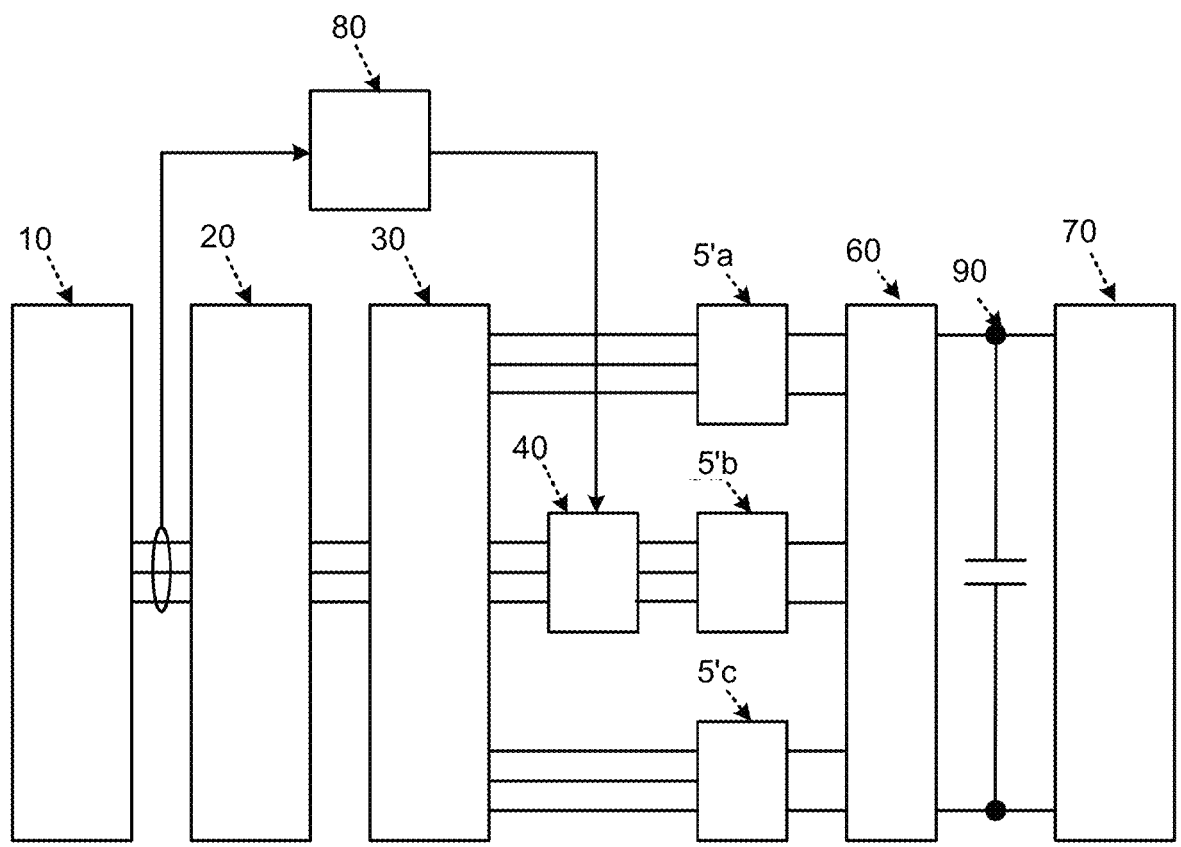
FIG. 5 is a schematic view of an 18-pulse ATRU modified according to another embodiment of the disclosure.

In another embodiment, rather than measuring output current as an indication of imbalance, the system may use a measure of input frequency (FIG. 5). A change in input frequency can be representative of power imbalance and, in this embodiment, is used as a signal input to controller 80 which adjusts the resistance of resistor 40 accordingly.

Other indications and measures of imbalance that could be used to adjust the resistance are also envisaged.

Whilst described in relation to an 18-pulse ATRU, it is also envisaged that the concepts described herein may be applied to other ATRU configurations with odd numbers of diode bridge rectifiers.

The use of a self-adjusting balancing resistor has been found by the inventors to keep the diode bridge rectifiers in balance at all operating frequencies as well as any other electrical characteristics that may cause impedance imbalance. By maintaining equal power flow through all of the rectifiers, the ATRU power loss and losses at other components of the system are considerably reduced. Further, the power quality of the input currents and the output current is improved and maintained which, in turn, means that there is less reliance on filters and so simpler filter designs can be employed.

The invention claimed is:

1. An auto-transformer rectifier system comprising:
an n-pulse autotransformer rectifier unit (ATRU), where n is 18 or a multiple of 18, having, for each value of n, three diode bridge rectifiers and a balancing resistor balance the power flow through the diode bridge rectifiers;
wherein the balancing resistor has a variable resistance;
the auto-transformer rectifier system further comprising:
a controller configured to identify imbalances between power flows of the respective diode bridge rectifiers and to adjust a resistance of the balancing resistor in response to the detected imbalance.

2. The system of claim 1, wherein the controller comprises an analog circuit configured to detect signals indicative of imbalances between power flows of the diode bridge rectifiers and to adjust the resistance of the balancing resistor in response thereto.

3. The system of claim 1, wherein the variable resistor comprises a solid state resistor.

4. The system of claim 1, wherein the variable resistor includes a combination of fixed and variable resistors.

5. The system of claim 1, wherein the controller is configured to identify imbalances based on a difference between the output currents of two or all of the diode bridge rectifiers, the system comprising means for measuring the output currents of the two or all diode bridge rectifiers and providing an output current measure signal to the controller, the controller configured to compare the output current measure signals to provide an error signal used to adjust the resistance of the balancing resistor.

6. The system of claim 1, wherein the controller is configured to identify imbalances based on a change in input frequency.

7. A method of balancing power flow through an auto-transformer rectifier unit (ATRU) having multiple diode bridge rectifiers, the method comprising:
   detecting an imbalance between power flows of the respective multiple diode bridge rectifiers and adjusting a resistance of a balancing resistor of the ATRU in response to the detected imbalance;
   wherein detecting the imbalance comprises identifying a change in input frequency and wherein the resistance is adjusted in response thereto.

8. The method of claim 7, wherein identifying imbalances comprises comparing output currents of two or more of the diode bridge rectifiers and wherein the resistance is adjusted in response to a difference therebetween.

9. The method of claim 7 wherein the ATRU has an odd number of diode bridge rectifiers.

10. The method of claim 7, wherein the ATRU is an 18-pulse, or multiple of 18-pulse ATRU.

\* \* \* \* \*